UNITED STATES PATENT OFFICE.

FREDERICK H. EICHBAUM, OF DETROIT, MICHIGAN, ASSIGNOR OF TWO-THIRDS HIS RIGHT TO WILLIAM W. HORTON, J. T. SALTER, J. H. SHELDON, AND JAMES AIKEN, OF CHICAGO, ILLINOIS.

IMPROVEMENT IN PREPARED WOOD FOR THE MANUFACTURE OF ILLUMINATING-GAS.

Specification forming part of Letters Patent No. 176,288, dated April 18, 1876; application filed January 13, 1875.

*To all whom it may concern:*

Be it known that I, FREDERICK H. EICHBAUM, of Detroit, in the county of Wayne and State of Michigan, have invented a new and useful Improvement in Prepared Wood for the Manufacture of Illuminating-Gas; and I do hereby declare that the following is a full and exact description of the same, reference being had to the accompanying drawings and to the letters of reference marked thereon.

It is well known, by those familiar with the manufacture of gases, that the gases produced from non-resinous woods, and from all the varieties of wood common in this country called hard woods, are too deficient in illuminating power to make a gas of commercial value. It is also well known that what are usually called hydrocarbons, on the other hand, make too rich a gas for commercial purposes when used alone. It is also well known that many of the hydrocarbons, as for instance some of the products of petroleum, are extremely dangerous in use, so that there are stringent laws regulating their transportation, storage, or use.

Now, the object I have in view is the production of a gas-fuel, wherein the non-resinous or hard woods may be infused or impregnated with hydrocarbons to a precise and definite degree, so that the product will be a gas-fuel which, by the destructive distillation in any suitable retort, will evolve a fixed or permanent gas of the precise candle-power required, and which shall be convenient in use and safe in handling or transportation; and my invention therein consists in such gas fuel prepared as hereinafter set forth.

In order that those skilled in the art may be able to make and use my invention, I proceed to describe the same more particularly.

It is well known that some of the resinous woods, as, for instance, the long-leafed pine, produce an excellent quality of gas of sufficient candle-power, but the woods most common in some portions of the country, like the oak, beech, maple, ash, and poplar, and others, do not produce a gas of sufficient illuminating power for commercial purposes.

I take such woods, and, cutting them into convenient lengths or shapes, subject them to any ordinary or suitable process for extracting the water therefrom. This may be done by steaming, or by kiln-drying, or even by exposure of the wood to the air, the only object being, in any way, to have the moisture sufficiently expelled from the wood.

I then take the wood, thus prepared, and place it in suitable tanks or vessels, where it may be subjected to a bath of proper hydrocarbons; or, preferably, it may be subjected to proper hydrocarbons under pressure, whereby the pores of the wood will be impregnated with such hydrocarbons.

The quantity of hydrocarbons required for the proper saturation or impregnation of such woods differs greatly in the sort of wood, and the hydrocarbon employed. For the ordinary hard woods, from fifteen to twenty pounds of coal-oil to one hundred pounds of wood will be found sufficient for the production, by destructive distillation of such woods, of an illuminating-gas of twenty-candle power.

The wood, thus saturated or impregnated, after being removed from the vessel or tank should be exposed to the air for a short period, in order to become dried externally, and made more convenient for handling or for transportation.

This wood thus prepared is ready for use in the production of illuminating-gas in any of the methods, or with any of the apparatus, which are used for producing such gases.

The particular process described, however, is equally applicable to any other vegetable substances, as, for instance, grasses, straws, corn-husks, corn-cobs, and many other vegetable substances.

The particular advantages connected with my process, and with the treated wood, are as follows: The treated wood itself can be handled as conveniently and safely as untreated wood, and thereby the objections affecting the transportation and storage of hydrocarbons are obviated.

From the wood thus treated, an illuminating-gas may be produced of any candle-power desired, this result depending upon the quality and quantity of the hydrocarbons infused into the wood, and from such wood an illuminating-gas may be produced more cheaply than heretofore.

I am aware that woods have been infused or impregnated with certain of the hydrocarbons for the purpose of preservation, such woods being used for pavements, railroad-ties, in bridge-building, and in other places, where an exposure to moisture would involve a more or less speedy destruction of such woods. Such woods, however, are uniformly of some of the coniferous varieties, and are not such as I intend to use. Such woods, moreover, are always more or less manufactured, to the extent at least of the removal of the sap. In the processes for treating the woods just mentioned for the purposes of preservation, it is essential that they should be infused or impregnated with the hydrocarbons used to the fullest extent, or the object desired will not be accomplished, and the effect of preservation is accomplished, if at all, by such hydrocarbons acting as antiseptics in arresting the decay which results from the chemical combination of water or moisture, with the various soluble acids contained in such woods. My invention differs from those just named, in that it is applied to a class of woods, in the log or tree, and to vegetable substances which have little or no soluble acids, and where the hydrocarbons used in heating wood for preservation, if applied to them, would not preserve them, as from the closeness of grain of such hard woods a sufficient quantity of hydrocarbons cannot be infused into them to exert any beneficial result. It differs also in respect that it is not essential or desirable to impregnate or infuse into the wood all the quantity possible of hydrocarbons, as such a course would be more expensive, and the wood thus treated would not be so convenient for handling or for transportation; but it is desirable to infuse a certain predetermined quantity, differing with the varieties of the wood, and the particular degree of candle-power desired to be produced from such wood. I am also aware that waste woods, in a fragmentary form, from saw-mills, have been submitted to a bath of boiling oils, and afterward coated with resins, and such like, to exclude the air, and preserve such oils from evaporation, and the woods thus prepared have been used for kindling fires; but my invention differs in this, that mine is applied to hard woods and preferably to round wood, from which the bark need not be removed, and it has no outside coating of resins, or of any other materials.

Having thus described my invention, what I claim as new therein, and for which I desire Letters Patent, is—

A gas-fuel, composed of non-resinous or hard woods, infused with a certain definite quantity of hydrocarbons, so that, by destructive distillation, it will evolve a permanent or fixed illuminating-gas of a desired candle-power.

This specification signed and witnessed this 9th day of January, 1875.

FREDERICK H. EICHBAUM.

Witnesses:
  J. H. SHELDON,
  CHARLES THURMAN.